March 1, 1960     C. H. BROOKS     2,927,006
OLEFIN POLYMERIZATION IN A PULSATING REACTOR
Filed May 2, 1957
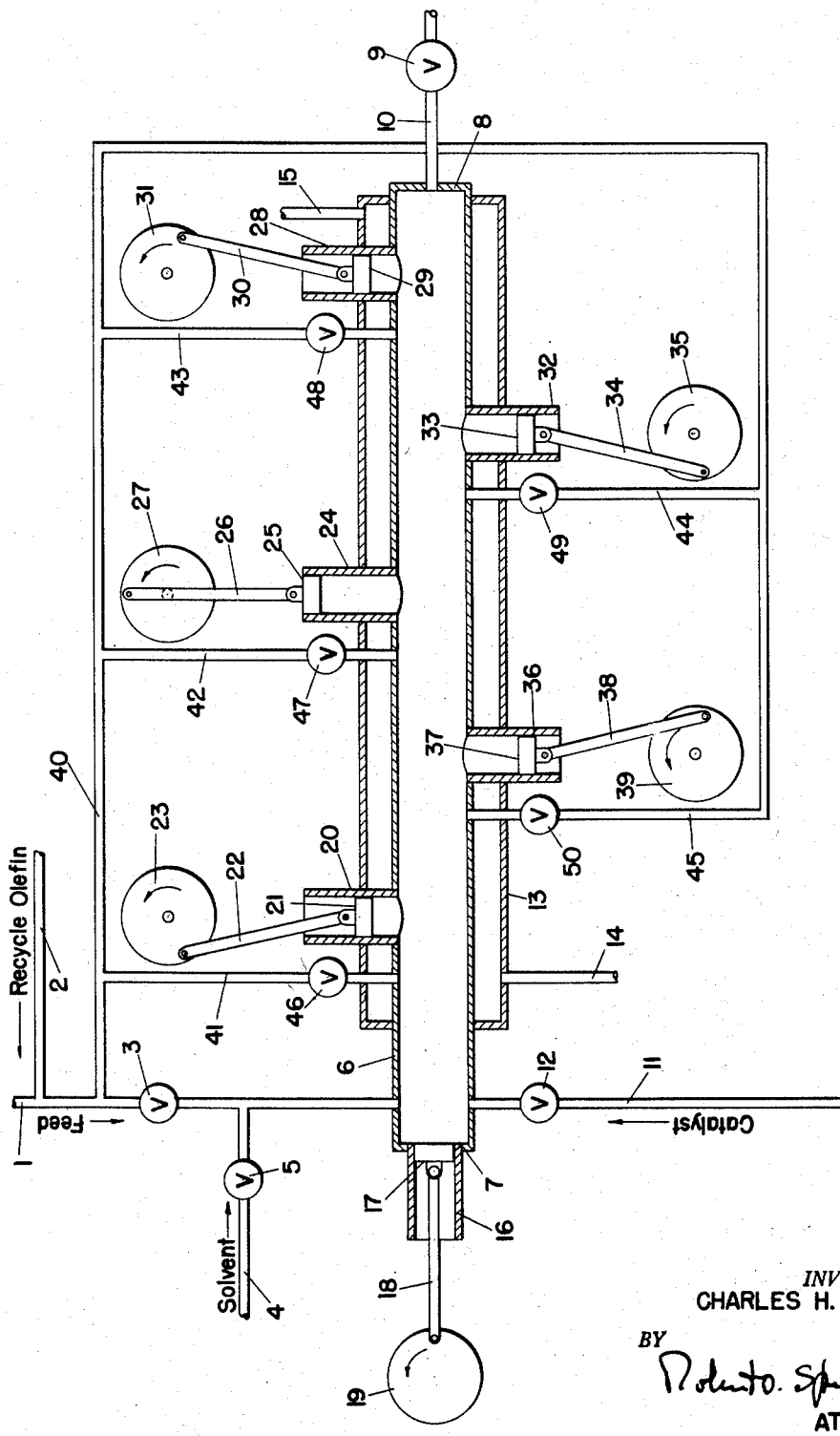
INVENTOR.
CHARLES H. BROOKS
BY
Roberto. Spindle
ATTORNEY

United States Patent Office 2,927,006
Patented Mar. 1, 1960

2,927,006

OLEFIN POLYMERIZATION IN A PULSATING REACTOR

Charles H. Brooks, Swarthmore, Pa., assignor to Sun Oil Company, Philadelphia, Pa., a corporation of New Jersey Application May 2, 1957, Serial No. 656,540

8 Claims. (Cl. 23—252)

This invention relates to the polymerization of normally gaseous olefins in the presence of an activated metal halide catalyst, and more particularly to a process in which the reagents are continuously maintained in a state of turbulent flow until the completion of the reaction. While the process of the present invention is of value in the polymerization of ethylene to form a high density polyethylene since it assures maximum access of ethylene to the catalyst during reaction, it is of particular value in the polymerization of propylene and butylene, during which apparently two competing reactions take place, one of which is believed to be a heterogeneous catalysis leading to the formation of a high density crystalline isotactic polymer having great utility as a plastic material, the other of which is believed to be a homogeneous liquid phase polymerization leading to the formation of a viscous to semi-solid atactic polymer which has no known use.

In the manufacture of isotactic polymers from propylene and butylene, it has been the practice to conduct the reaction as a batch process in an autoclave fitted with a stirrer in order to provide agitation. A solution of olefin in an inert hydrocarbon solvent, such as a 50/50 mixture of propylene and isooctane, is charged to the reactor, the catalyst is added, and agitation is started while holding the reactor under the autogenous pressure of the reaction mixture.

Suitable catalysts for the reaction include complexes formed by the reaction of a halide of a metal of groups IV, V and VI with an activator which acts as a strong reducing agent, such as alkyl derivatives of aluminum, zinc, beryllium, chromium, magnesium, sodium, potassium and lithium. Aluminum triethyl, aluminum triisopropyl, aluminum triisobutyl and the magnesium and zinc analogues are preferred, but metal alkyls containing up to about 12 carbon atoms in the alkyl groups can be used with good results. While the metal halide activated by the activator is preferably titanium trichloride, halides of zirconium, hafnium, vanadium, niobium, chromium, molybdenum or tungsten may also be used. The complex is prepared by slurrying the metal halide and the activator in an inert medium such as n-heptane or isooctane in a mol ratio of from about 1:10 to 10:1, although ratios of from 1:4 to 3:4 are preferred. The catalyst complex should be present in the reaction mixture in an amount of from about 0.001% to about 0.25% by weight, preferably about 0.1%.

It has been found that the rate of the reaction leading to the formation of the undesired atactic polymer is relatively insensitive to temperature, whereas the rate of the reaction leading to the formation of the isotactic polymer is exceedingly slow at temperatures under 60° C., but it increases rapidly as the temperature is raised above 60° C., so that at temperatures above this point the ratio of isotactic to atactic polymer produced rises rapidly with increasing temperatures. At temperatures between 60° C. and 80° C. the isotactic polymer comes out of solution as it is formed as a granular, easily handled solid. At these temperatures the rate of formation of isotactic polymer is still relatively slow, so that an undesirably large amount of atactic polymer is formed during the time required to secure an economic yield of isotactic polymer per unit weight of catalyst. At temperatures in excess of about 80° C., however, while the reaction time to produce an economic yield of isotactic polymer is much shorter, so that less atactic is produced, a stringy isotactic polymer comes out of solution which tends to wrap itself around the stirrer and the stirrer shaft and tends clog up the reaction vessel. This form of polymer is exceedingly difficult to remove from the reactor. Consequently, workers in this field have been forced to operate at temperatures between 60° C. and 80° C., accepting the penalty of undesirably high atactic polymer formation at these temperatures.

Another defect inherent in conducting the reaction in a stirred autoclave is the lack of uniform agitation throughout the reactor. While good agitation is provided adjacent to the stirrer blade and the walls, there will inevitably be a zone of relative quiescence adjacent the stirrer shaft. Formation of isotactic polymer proceeds by attachment of a monomer to a catalyst particle, followed by successive introduction of monomers between the catalyst particle and the growing polymer chain. As the reaction proceeds the catalyst surface becomes coated with polymer, so that it becomes increasingly difficult to introduce monomer to the catalyst surface. Consequently, in the relatively quiescent zone the rate of formation of isotactic polymer will fall off appreciably, since less monomer will be reaching the catalyst surface than in the relatively turbulent zone. In the meantime, however, the rate of formation of atactic polymer, which is soluble in the solvent, will continue unchanged in the relatively quiescent zone as compared to its rate of formation in the relatively turbulent zone. Consequently, the presence of a relatively quiescent zone will lower the isotactic/atactic ratio.

A still further disadvantage in conducting the polymerization in a stirred autoclave as a batch operation is that the monomer/solvent ratio will continuously decline during the reaction. While some shrinkage in the volume takes place during polymerization, so that additional monomer may be added during the reaction, it is not possible to replace all of the monomer reacted. Consequently, the reaction rate will slow down during the course of the reaction, since less monomer will reach the catalyst surface from a monomer-poor solution per unit of time than from a monomer-rich solution, and the time required for completion of the reaction will be far longer than would be required if the monomer content of the solution could be maintained at its original value.

It is an object of this invention to provide an apparatus for conducting a chemical reaction in which a uniformly turbulent flow of reactants is maintained throughout the reactor.

It is a further object of this invention to provide a continuous process for the polymerization of normally gaseous olefins in which the monomer/solvent ratio is maintained substantially constant during the reaction.

I have now found that the foregoing objects may be attained by continuously passing a reaction mixture comprising monomer, solvent, and catalyst through an elongated tubular reactor which is equipped with an even number of piston means in excess of two connecting therewith, evenly spaced along the length of the reactor. The piston means operate as overlapping pairs, which displace the same amount of liquid during each power stroke, the individual members of each pair operating in a cycle 180° out of phase with each other, while each pair is out of phase with any adjacent pair. The piston means are operated at a speed such as to cause the reaction mixture in the reactor to move back and forth along the reactor at a speed above the critical velocity of the mixture, even though the average linear velocity of the reaction mixture through the reactor is relatively low. Since the pairs of piston means operate 180° out of phase, the total volume available to the reaction mixture will remain constant at all times. Thus the entire content of the reactor may be maintained in turbulent flow at all times.

In order to maintain the monomer/solvent ratio of the reaction mixture constant, a plurality of feed inlets is provided along the reactor downstream of the point of inlet of the original monomer/solvent mixture, adjacent to each of the cylinders. Substantially pure monomer is introduced to the reactor through each of these inlets in a quantity equal to that used up in the polymerization reaction during the passage of the reaction mixture from the inlet next upstream to the point of introduction of the additional monomer. Due to the turbulent back and forth flow of the reaction mixture, the added monomer is quickly distributed up and down the reactor so that the monomer/solvent ratio throughout the reactor is maintained at a reasonably constant value. It will be understood, of course, that the rate of withdrawal of reaction products from the reactor will be sufficiently greater than the rate of introduction of the original feed to compensate for the additional volume of monomer introduced through the intermediate feed inlets. As a result, the mean linear velocity of the reaction will gradually increase as the mixture passes through the reactor from the inlet end to the outlet end. Since this is so, the displacement of the piston pairs adjacent the outlet may be smaller than that of the piston pairs adjacent the inlet, while still maintaining turbulent flow throughout the reactor, with consequent saving of power cost, although this is not an essential part of this invention.

Introduction of monomer to the reactor in increments as described above has two advantages other than the maintenance of the monomer/solvent ratio. First, the monomer so introduced may be chilled prior to introduction, so as to provide cooling by direct heat exchange with the reaction mixture, and second, it provides sufficient additional fluid so that a manageable slurry of solid polymer in solvent and unreacted monomer may be withdrawn from the outlet of the reactor.

In order that those skilled in the art may more fully appreciate the nature of my invention and the manner of carrying it out, an example thereof will be more fully described in connection with the accompanying drawing, which is a cross-sectional view of a reactor constructed according to the present invention, together with certain auxiliary pieces of equipment necessary to the practice of the process of the invention when polymerizing propylene.

Fresh propylene is taken from storage through line 1 at a temperature of 140° F. and under a pressure of 350 p.s.i.g., under which conditions it is in liquid phase, and is mixed with recycle propylene, at the same temperature and pressure, from line 2. A portion of the propylene is then passed through control valve 3, and is mixed with isooctane, which is introduced through line 4 under control of valve 5, in an amount equal in volume to the volume of propylene introduced through valve 3. The isooctane is preheated, prior to introduction to the process, to a degree such that the mixture of propylene and isooctane is maintained at 176° F. The mixture is then passed to reactor 6, which is provided with end closure plates 7 and 8, and which is maintained at a pressure in excess of that required to maintain the system as all liquid, i.e., for 50/50 isooctane and propylene this would be approximately 300 p.s.i.g., by back pressure valve 9 in outlet line 10, located at the far end of reactor 6. Catalyst, formed by reacting aluminum triethyl with titanium trichloride in a mol ratio of 0.6 to 1, is introduced to reactor 6 through line 11, under the control of valve 12, in an amount equal to 0.1% by weight of the propylene-isooctane mixture. It will be noted that reactor 6 is provided with jacket 13, having an inlet line 14 and an outlet line 15 through which heat-exchange fluid may be circulated to maintain a constant temperature of 176° F.

Reactor 6 is also provided with a plurality of cylinders 16, 20, 24, 28, 32 and 36, spaced along the length of the reactor, which are fitted with pistons 17, 21, 25, 29, 33 and 37. These pistons are connected to driving means, illustrated as crank arms 18, 22, 26, 30, 34 and 38, connected to flywheels 19, 23, 27, 31, 35 and 39 driven by a source of power not shown, which serve to reciprocate the pistons within their associated cylinders. It will be understood, of course, that any other form of driving means known to the art may be used, provided that the means is capable of co-operatively and synchronously driving the pistons. The pistons are arranged in overlapping pairs, the individual members of each pair being 180° out of phase with each other, while each pair is out of phase with the adjacent pair or pairs. Thus, in the embodiment illustrated in the drawing, pistons 17 and 25 form one pair, piston 17 being at the end of its power stroke while piston 25 is fully withdrawn; pistons 21 and 33 form another pair, piston 21 having completed two-thirds of its power stroke, while piston 33 has completed two-thirds of its return stroke; and pistons 29 and 37 form still another pair in which piston 29 has completed one-third of its return stroke and piston 37 has completed one-third of its power stroke. The purpose of having the pairs overlap is to avoid any periods of stagnancy, which would occur during reversal of flow if the members of each pair were located adjacent each other. Since one or more pistons, operating out of phase with the pair members, are interposed between them, a constant turbulent flow throughout the reactor is assured at all times. Since the pair members operate 180° out of phase with each other, the volume of the reaction space, considered as the volume of the reactor plus the volume of the cylinders exposed by the pistons, will remain constant at all times, so as to insure a constant linear flow of reactants through the reactor. The stroke and speed of the pistons is controlled to maintain the flow of reactants in the reactor above the critical velocity, which will give a dimensionless Reynolds number of at least 2100, and preferably to give a Reynolds number greater than 100,000.

As the reactants pass through reactor 6, propylene present in the feed mixture will polymerize, so that the monomer/solvent ratio in the reacting mixture would decline unless make-up propylene were to be provided. In order to provide such make-up, so as to maintain the monomer/solvent ratio substantially constant throughout the reactor, a feed manifold 40 is connected to feed line 1. Auxiliary feed lines 41, 42, 43, 44 and 45 connect the manifold 40 with reactor 6 at a point adjacent to and ahead of each cylinder. Flow of propylene through these auxiliary feed lines is controlled by valves 46, 47, 48, 49 and 50, respectively, to provide additional propylene in an amount equal to that used up in the polymerization reaction during its passage along the reactor from the inlet next upstream. Due to the turbulence existing in the reactor, the added propylene is quickly distributed throughout the reaction mixture to maintain the monomer/solvent ratio constant, in order to insure access of monomer to the catalyst surface at a reasonable rate. The rate of access to the catalyst will, of course, be lessened as polymer builds up on the catalyst particles, so that the rate of addition of propylene through the downstream auxiliary feed lines will be less than the rate of admission through the upstream auxiliary feed lines.

A reaction product comprising isooctane, unreacted propylene, and polypropylene is removed from reactor 6 through line 10 under the control of valve 9 for further processing to recover polypropylene. Since this further processing forms no part of the present invention, it has not been illustrated in the drawing. According to conventional processes, the reaction mixture withdrawn through line 10 is passed to a filter, from which a filter cake comprising isotactic polypropylene and catalyst, and a filtrate comprising unreacted propylene, isooctane, dissolved atactic polypropylene and any catalyst activator in excess are separately recovered. The filter cake is then treated with a catalyst deactivator, such as methanol, is dried, and is then ground to form a saleable polypropylene moulding powder, while the filtrate is subjected to fractional distillation to separately recover propylene, isooctane and any catalyst activator in excess for recycle to the polymerization step, and atactic polypropylene for such disposal as may be required.

While the apparatus of the present invention has been particularly described in connection with a process for polymerizing propylene in the presence of an aluminum alkyl-titanium halide catalyst, the appended claims to the apparatus should not be construed as being limited to its use in such a process, since the apparatus has wide applicability to any process in which it is desired to maintain the liquid mixture to be treated in a state of strong turbulence, while maintaining a relatively low mean linear velocity through the reactor.

The invention claimed is:

1. A chemical processing apparatus comprising in combination a closed elongated shell having an inlet and outlet adjacent the respective ends thereof, a valved inlet line connecting with the inlet, a valved outlet line connecting with the outlet, a plurality of piston means associated with said shell, said piston means being arranged in overlapping pairs along the length of the shell, and means for co-operatively and synchronously reciprocating said piston means in a manner to reciprocate one of the piston means of each pair 180° out of phase with the other piston means of the pair, and out of phase with adjacent pairs of piston means.

2. A chemical processing apparatus comprising in combination an elongated shell, a closure plate on each end of said shell, said shell having an inlet and outlet adjacent the respective ends thereof, a valved inlet line connecting with the inlet, a valved outlet line connecting with the outlet, a plurality of cylinders communicating with the interior of said shell, said cylinders being arranged in overlapping pairs along the length of the shell, a piston associated with and movable reciprocally within each of said cylinders, and means for co-operatively and synchronously reciprocating each of said pistons in a manner to reciprocate the piston associated with one of the cylinders of each pair 180° out of phase with the piston associated with the other cylinder of the pair, and out of phase with the pistons associated with adjacent pairs of cylinders.

3. The apparatus according to claim 2 in which one of said cylinders is associated with the closure plate adjacent the inlet.

4. A chemical processing apparatus comprising in combination a closed elongated shell having a plurality of inlets spaced along the length thereof and an outlet adjacent one end thereof, inlet lines connecting with each of said inlets, flow control means interposed in each of said inlet lines, an outlet line connecting with said outlet, flow control means interposed in said outlet line, a plurality of piston means associated with said shell, said piston means being arranged in overlapping pairs along the length of the shell, and means for co-operatively and synchronously reciprocating said piston means in a manner to reciprocate one of the piston means of each pair 180° out of phase with the other piston means of the pair, and out of phase with adjacent pairs of piston means.

5. A chemical processing apparatus comprising in combination an elongated shell having an inlet and outlet adjacent the respective ends thereof, and a plurality of auxiliary inlets spaced along the length thereof, a closure plate on each end of said shell, inlet lines connecting with said inlet and said auxiliary inlets, flow control means interposed in each of said inlet lines, an outlet line connecting with said outlet, flow control means interposed in said outlet line, a plurality of piston means associated with said shell, said piston means being arranged in overlapping pairs along the length of the shell, and means for co-operatively and synchronously reciprocating said piston means in a manner to reciprocate one of the piston means of each pair 180° out of phase with the other piston means of the pair, and out of phase with adjacent pairs of piston means, each of said auxiliary inlets being located adjacent to and upstream of one of said piston means.

6. The apparatus according to claim 5 in which one of said piston means is associated with the closure plate adjacent the inlet.

7. A chemical processing apparatus comprising in combination an elongated shell having an inlet and outlet adjacent the respective ends thereof, and a plurality of auxiliary inlets spaced along the length thereof, a closure plate on each end of said shell, inlet lines connecting with said inlet and said auxiliary inlets, flow control means interposed in each of said inlet lines, an outlet line connecting with said outlet, flow control means interposed in said outlet line, a plurality of cylinders communicating with the interior of said shell, said cylinders being arranged in overlapping pairs along the length of the shell, a piston associated with and movable reciprocally within each of said cylinders, and means for co-operatively and synchronously reciprocating each of said pistons in a manner to reciprocate the piston associated with one of the cylinders of each pair 180° out of phase with the piston associated with the other cylinder of the pair, and out of phase with the pistons associated with adjacent pairs of cylinders, each of said auxiliary inlets being located adjacent to and upstream of one of said cylinders.

8. The apparatus according to claim 7 in which one of said cylinders is associated with the closure plate adjacent the inlet.

References Cited in the file of this patent

UNITED STATES PATENTS

| Number | Name | Date |
|---|---|---|
| 1,503,646 | Fish | Aug. 5, 1924 |
| 1,634,249 | Lindequist | June 28, 1927 |
| 1,694,589 | Fish | Dec. 11, 1928 |
| 1,780,853 | Walsh | Nov. 4, 1930 |
| 2,406,403 | Rogers | Aug. 27, 1946 |
| 2,565,960 | Garber et al. | Aug. 28, 1951 |
| 2,691,647 | Field et al. | Oct. 12, 1954 |
| 2,739,879 | Bates et al. | Mar. 27, 1956 |
| 2,814,552 | Van Dijck | Nov. 26, 1957 |